United States Patent Office 2,727,893
Patented Dec. 20, 1955

2,727,893

N,N-DIMETHYL-N'-(N-OCTYL)-N'-HETEROCYCLIC ETHYLENEDIAMINES

John F. Reinhard, Bronxville, and John A. King, Manhasset, N. Y., assignors to Warner-Hudnut, Inc., New York, N. Y., a corporation of Delaware No Drawing. Application April 22, 1953, Serial No. 350,522

5 Claims. (Cl. 260—256.4)

This invention relates to new chemical compounds, and more particularly to new compounds having pharmaceutical activity, particularly as fungicides.

It is an object of this invention to provide new products having pharmaceutical activity.

The compounds of our invention may be represented by the structural formula:

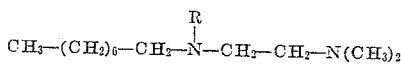

wherein R represents a mono-alkyl substituted or unsubstituted mononuclear heterocyclic radical consisting of 2-pyrimidyl or 2-pyrazyl.

These compounds may be prepared for example by heating the appropriate 2-amino-heterocyclic compound with dimethylaminoethyl chloride followed by condensation of the product with actyl bromide. The new compounds may likewise be obtained by reacting N,N-dimethyl-N'-(n-octyl)ethylenediamine with the suitable 2-halo-heterocyclic compound. Alternatively it is possible to react dimethylaminoethyl chloride with the appropriate N-heterocyclic-substituted n-octylamine. In these processes it is desirable to use an acid binding, condensing agent such as sodamide and a solvent such as toluene or xylene.

The free basic ethylenediamine derivatives of our invention are essentially water-insoluble liquids; water-soluble acid-addition salts thereof may be formed by treating the free bases with acids such as hydrochloric, sulfuric, tartaric or citric acid.

The new compounds are therapeutically useful as antispasmodics, antihistamines, local anesthetics, bactericides and particularly as fungicides.

The present invention may be illustrated by the following examples:

*Example 1.* — *N,N - dimethyl - N' - (n - octyl) - N' - (2 - pyrimidyl) - ethylenediamine and the hydrochloride thereof*

A mixture of N,N-dimethyl-N'-(2-pyrimidyl)-ethylenediamine (170 g., 1.05 mole, prepared as described in J. Amer. Chem. Society, volume 67, pp. 735-8, 1945) 95% sodamide (44.2 g., 1.05 mole) and dry toluene (500 cc.) was heated under reflux two hours. Thereafter, a solution of n-octyl bromide (205 g., 1.05 mole) in dry toluene (200 cc.) was added over a one-hour period whereafter the mixture was heated under reflux twenty hours. The mixture was then cooled, filtered and the filtrate was stripped of toluene and fractionally distilled, yielding the desired free base (74 g.) B. P. 120-143° C. at 0.3 mm. The base was then dissolved in dry ether (150 cc.) and the resulting solution was treated with a solution of hydrogen chloride (0.31 mole) in alcohol (110 cc.). There was then added three volumes of dry ether and the mixture was chilled overnight at about 5° C. Filtration of the resulting mixture gave a solid which after recrystallization from acetone yielded the desired hydrochloride (37 g.), M. P. 134.5–135° C.

*Example 2.* — *N,N - dimethyl - N' - (n - octyl) - N' - (2 - pyrazyl) ethylenediamine and the hydrochloride thereof*

A mixture of n-octylamine (220 g., 1.69 mole), 95% sodamide (142 g., 3.38 moles) and toluene (1200 cc.) was refluxed two hours, cooled and dimethylaminoethyl chloride (244 g., 1.69 mole) was added thereto in small portions. Refluxing was continued for another 48 hours and the reaction was then cooled, filtered, and the filtrate was stripped of toluene and fractionally distilled whereupon N,N-dimethyl-N'-(n-octyl)-ethylenediamine (33.2 g., 0.16 mole) was obtained, B. P. 77–80° C. at 0.6 mm., $$n_D^{26°} = 1.4392$$

A solution of 2-pyrazyl chloride (9 g., 0.08 mole) in the N,N - dimethyl - N' - (n - octyl) - ethylenediamine was then heated at 180–200° C. one and one-half hours. The solution was then cooled and treated with 16% aqueous sodium hydroxide (75 cc.). The oily layer formed was separated and the aqueous phase was extracted with two successive lots of ether (2×50 cc.) and the resulting ether extract was combined with the aforesaid oily layer. The resulting ethereal mixture was dried over solid potassium hydroxide, filtered and the filtrate was stripped of ether and fractionally distilled, yielding the desired free base (15.5 g.) B. P. 118–142° C. at 0.1 mm., $n_D^{26°} = 1.5040$. The base was then dissolved in dry ether (2 parts by volume), and the resulting solution was chilled and treated with a solution of hydrogen chloride (2.03 g., 0.056 mole) in alcohol (3.3 g.). Ether (80 cc.) was then added and the mixture was chilled overnight at about 5° C. Filtration of the resulting mixture gave a solid which after recrystallization from acetone yielded the desired hydrochloride (11 g.), M. P. 103.5–105° C.

The invention has been described in Examples 1 and 2 preparing the unsubstituted 2-pyrimidyl and 2-pyrazyl compounds. In place of the unsubstituted 2-halo-heterocyclic compound one may employ as starting materials alkyl mono-substituted 2-halo-heterocyclic compounds in which the alkyl group contains not over 5 carbon atoms. Thus, 5-methyl 2-pyrimidyl, 5-ethyl 2-pyrazyl, and other mono-alkyl substituted derivatives may be prepared employing the appropriate substituted 2-halo heterocyclic compounds in the preparation described in Example 2.

While the invention has been described in the form of specific examples and embodiments, various other modifications will be apparent to those skilled in the art and it is intended to cover other such modifications that fall into the spirit and scope of the appended claims.

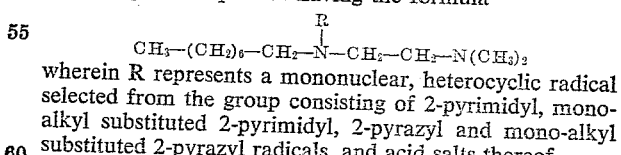

What is claimed is:

1. A composition of matter selected from the group consisting of compounds having the formula $$CH_3-(CH_2)_6-CH_2-\underset{\underset{R}{|}}{N}-CH_2-CH_2-N(CH_3)_2$$

wherein R represents a mononuclear, heterocyclic radical selected from the group consisting of 2-pyrimidyl, mono-alkyl substituted 2-pyrimidyl, 2-pyrazyl and mono-alkyl substituted 2-pyrazyl radicals, and acid salts thereof.

2. The composition set forth in claim 1 wherein R is 2-pyrimidyl.

3. The composition set forth in claim 1 wherein R is 2-pyrazyl.

4. N,N - dimethyl - N' - (n - octyl) - N' - (2 - pyrimidyl) - ethylene diamine hydrochloride.

5. N,N - dimethyl - N' - (n - octyl) - N' - (2 - pyrazyl) - ethylene diamine hydrochloride.

References Cited in the file of this patent

UNITED STATES PATENTS